United States Patent [19]
Yasuda et al.

[11] Patent Number: 5,191,567
[45] Date of Patent: Mar. 2, 1993

[54] METHOD FOR PLAYBACK OF A PORTION OF A RECORDED DISK PLAYED BEFORE INTERRUPTION OF PLAYBACK

[75] Inventors: Shigeru Yasuda; Kenichiro Yasukawa, both of Tokorozawa, Japan

[73] Assignee: Pioneer Electronic Corporation, Tokyo, Japan

[21] Appl. No.: 532,242

[22] Filed: Jun. 5, 1990

Related U.S. Application Data

[63] Continuation of Ser. No. 184,141, Apr. 21, 1988, abandoned.

[30] Foreign Application Priority Data

Apr. 24, 1987 [JP] Japan .................................. 62-102393

[51] Int. Cl.⁵ .............................................. G11B 7/00
[52] U.S. Cl. ........................................ 369/32; 369/47; 358/342; 360/72.2
[58] Field of Search .................. 369/32, 44.26, 47–50, 369/53, 54, 44.28, 56–58, 233; 360/77.02, 72.1, 72.2, 73.03; 358/181, 335, 341, 342, 343

[56] References Cited

U.S. PATENT DOCUMENTS 4,772,962  9/1988  Tanaka et al. ..................... 360/72.2

FOREIGN PATENT DOCUMENTS 60-52984  9/1983  Japan ................................... 369/32

Primary Examiner—Aristotelis Psitos
Assistant Examiner—Muhamma N. Edun
Attorney, Agent, or Firm—Keck, Mahin & Cate

[57] ABSTRACT

A method of reproducing a last portion for a disk playing apparatus includes a step for memorizing in a memory device address data corresponding to a first recording position on a recording disk at which information under reproduction is recorded, in response to a memorization command. In response to a last scene reproduction command, playing operation of the disk playing apparatus is started from a second position which is, in order of recording, before the first recording position if the address data is memorized in the memory device. By the feature of staring the playing operation from the second position, generation of discontinuity between a part of a program recalled by a user and a rest of the program is prevented.

12 Claims, 6 Drawing Sheets

METHOD FOR PLAYBACK OF A PORTION OF A RECORDED DISK PLAYED BEFORE INTERRUPTION OF PLAYBACK

This application is a continuation of application Ser. No. 184,141, filed Apr. 21, 1988, now abandoned.

BACKGROUND OF THE INVENTION

1. Field of the Invention

The present invention relates to a method of reproducing a last portion for use in a disk playing system, and more specifically to a last portion, or last scene, reproducing method for use in a system for reproducing information recorded on an information recording disk such as a video disk.

2. Description of Background Information

Playing time of an information recording disk such as a video disk per side is as long as one hour at maximum, in general. Accordingly, to take the video disk as an example, there often arises a situation in which a user of video disk player is compelled to stop viewing of the program reproduced from the video disk such as a motion picture, in the middle of playing time. In such a case, if the user wants to see the rest of the program at a later time, it is conceivable to search a scene which the user saw last (a last scene) by using a fast scanning operation of the disk player system, that is, an alternating execution of the normal playing operation and a track jump operation. Such a method, however, is disadvantageous because the user of the disk player has to do intricate operations. Moreover, if the playback is started immediately when the scene which the user saw last is searched out. It is not possible for the user to sufficiently recall the (first) part of the story up to the last scene which the user has already seen. Thus, discontinuity will be generated between the recalled part of the story and the remaining part of the story which is to be seen subsequently.

OBJECT AND SUMMARY OF THE INVENTION

An object of the present invention is therefore to provide a last portion reproducing method in a disk playing system by which a remaining part of the recorded program after an interruption is played back with a simple operation while preventing the generation of the discontinuity of the recorded program such as a story.

A last part reproducing method according to the present invention comprises the steps of memorizing, in response to a memorization command, address data corresponding to a first recording position at which information under reproduction is recorded, and starting, in response to a last portion reproducing command, playback of recorded information from a second recording position which is before the first recording position in order of recording, by using the memorized address data.

DETAILED DESCRIPTION OF PREFERRED EMBODIMENTS

Referring to the accompanying drawings, the preferred embodiments of the present invention will be described hereinafter.

Figure 1:
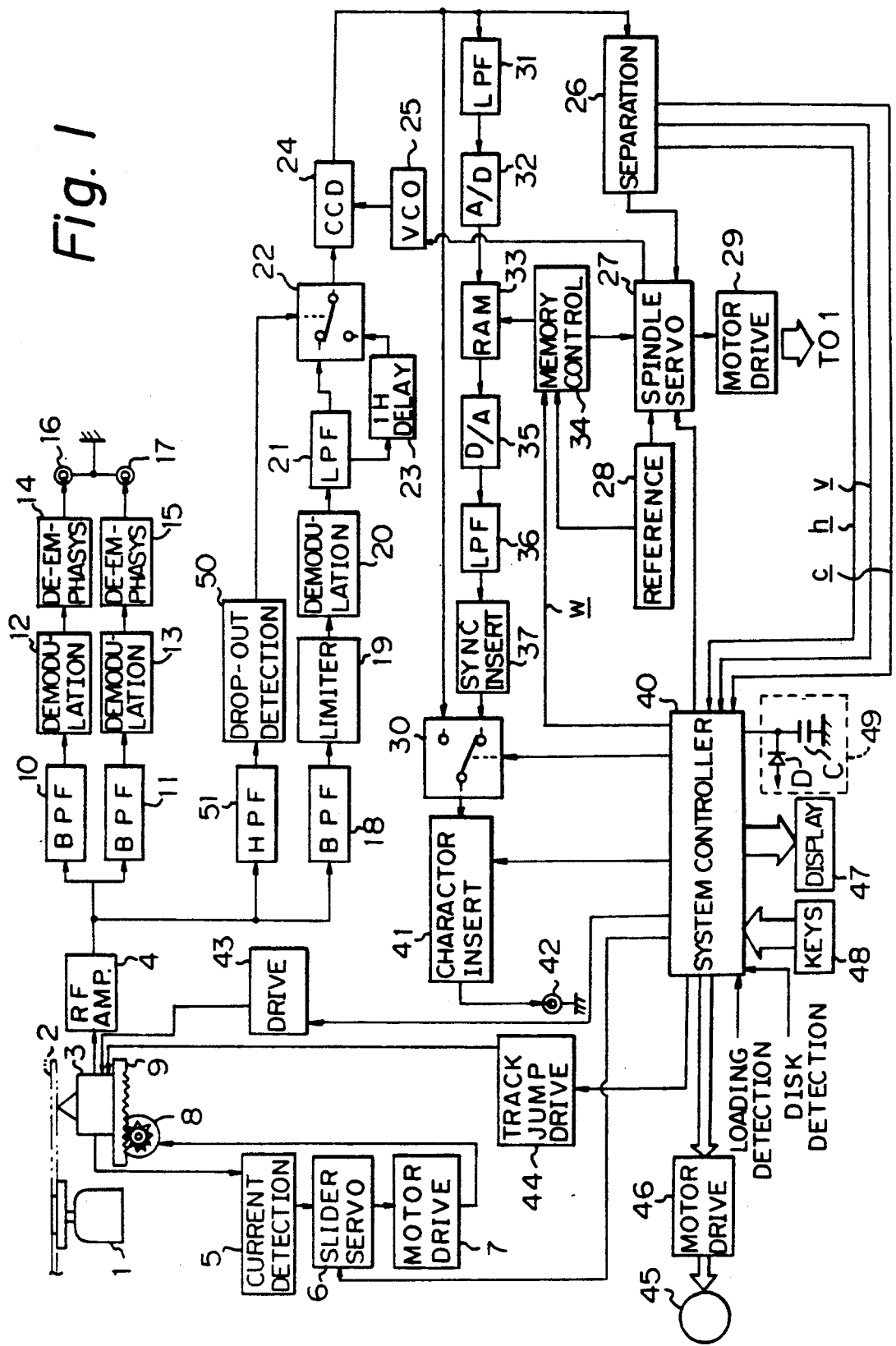
FIG. 1 is a block diagram showing an information playback system in which the last portion reproducing method according to the present invention is adopted.
Figure 2:
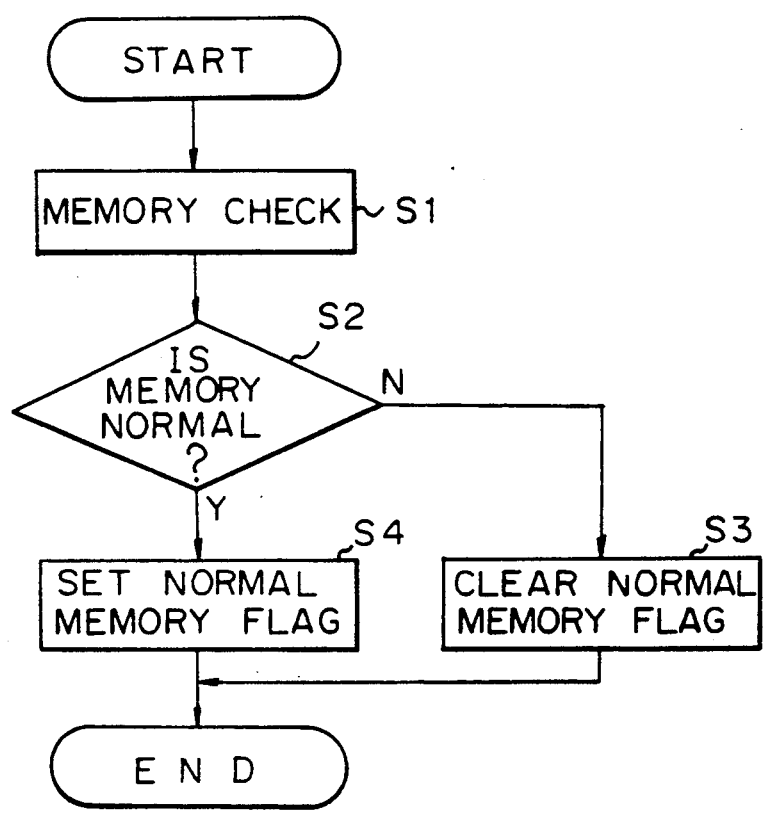
FIG. 2 is a flowchart showing the operation of the system shown in FIG. 1 immediately after the throw-in of the power current.

In FIG. 1, information recorded on a disk 2 which is rotated by a spindle motor 1 is read by means of an optical pickup 3. The pickup 3 has built-in elements such as a laser diode, an objective lens, a focus actuator, a tracking actuator, and photo detectors. Output signal of the pickup 3 is supplied to an RF amplifier 4 and to a focus servo circuit (not shown) and tracking servo circuit (also not shown) as well. The focus actuator and the tracking actuator in the pickup 3 are operated by means of these focus servo circuit and tracking servo circuit. The operation is performed so that a laser beam generated by the laser diode in the pickup 3 is focused on the recording surface of the disk 2, to form an information detecting light spot, and the position of the light spot in a radial direction of the disk 2 is controlled so as to place the light spot on a recording track formed on the recording surface of the disk 2.

A coil current is supplied to a drive coil of the tracking actuator in the pickup 3, and is also supplied to a current detection circuit 5. A current detection signal corresponding to the coil current is outputted from the current detection circuit 5, and supplied to a slider servo circuit 6. In the slider servo circuit 6, the current detection signal is amplified and its phase correction is performed. An output signal of the slider servo circuit 6 is supplied to a slider motor 8 as a drive signal through a motor drive circuit 7. A slider 9 carrying the pickup 3 and movable along the radial direction of the disk is driven by this slider motor 8, in such a manner that the tracking actuator in the pickup 3 is positioned at a middle position of its movable range.

On the other hand, an RF signal outputted from the RF amplifier 4 is supplied to band-pass filters (BPFs) 10 and 11 in which audio FM signals of right and left channels are separated. These two channel audio FM signals are respectively supplied to FM demodulators 12 and 13 in which two channel audio signals are reproduced. The two channel audio signals are supplied to de-emphasis circuits 14 and 15 in which frequency components emphasized at the recording time are put back to the original level. Audio signals outputted by the de-emphasis circuits 14 and 15 are supplied to audio output terminals 16 and 17.

Furthermore, the RF signal outputted by the RF amplifier 4 is supplied to a band-pass filter (BPF) 18 in which a video FM signal is separated. The video FM signal is limited in amplitude by a limiter 19, and in turn supplied to an FM demodulator 20 in which a video signal is reproduced. The video signal is supplied to one of input terminals of a change-over switch 22 for the drop-out compensation operation by way of a low-pass filter (LPF) 21. The other one of the input terminals of the change-over switch 22 is supplied with a video signal which is delayed by 1H (one horizontal synchronizing period) by means of a delay line 23. As a control signal, a drop-out detection signal generated at a drop-out detection circuit 50 is supplied to the change-over switch 22. The drop-out detection circuit 50 is supplied with a high frequency component of the RF signal separated at a high pass filter (HPF) 51. The drop-out detection circuit 50 is constructed, for example, to generate the drop-out detection signal by detecting the drop-out using a zero-crossing point of the high frequency component of the RF signal. By this drop-out detection signal, signal switching operation of the change-over switch 22 is controlled in such a manner that the video signal of 1H period before which is outputted from the 1H delay line 23 is selectively outputted from the change-over switch 22 when a drop-out occurs, thereby performing the drop-out compensation operation.

The video signal outputted from the change-over switch 22 is then supplied to a charge coupled device (CCD) 24. The OCD 24 is supplied with a clock signal generated at a voltage controlled oscillator (VCO) 25. In the CCD 24, the video signal is delayed by a time period corresponding to the frequency of the clock signal. The video signal outputted from this COD 24 is supplied to a separation circuit 26. The separation circuit 26 is constructed to separate from the video signal a horizontal synchronizing signal h, a vertical synchronizing signal v, and control data c such as Philips Code. The horizontal synchronizing signal h outputted from the separation circuit 26 is supplied to a spindle servo circuit 27. In the spindle servo circuit 27, the horizontal synchronizing signal h is compared in phase with a reference signal of a predetermined frequency supplied from the reference signal generation circuit 28, to generate a spindle error signal which corresponds to a phase difference between both signals. The spindle error signal is supplied to a motor drive circuit 29, so that the rotational speed of the motor 1 is controlled. At the same time, a control signal corresponding to the phase difference between the horizontal synchronizing signal and the reference signal is generated, and supplied to a control input terminal of the VOO 25. As a result, the oscillation frequency of the VOO 25 becomes to correspond to the phase difference between the horizontal synchronizing signal and the reference signal, and the signal delay time of the OOD 24 is varied in response to the phase difference. Thus, the error of time base is eliminated.

The video signal from which the error of time base is removed obtained by the OCD 24 is supplied to one of input terminals of a change-over switch 30, and at the same time, supplied to an A/D (analog to digital) converter 32 through a LPF 31. In the A/D converter 32, the video signal is sampled at a predetermined interval, and the sampled values are in turn converted to digital data. Output data from the A/D converter 32 are supplied to a RAM 33 operating as a video memory. Address control and mode control of the RAM 33 are performed by means of a memory control circuit 34. The memory control circuit 34 is constructed to perform control operations such that data stored in each address of the RAM 33 are read-out in sequence in accordance with the clock signal from the reference signal generation circuit 28, and the rewrite of contents in each address of the RAM 33 is performed in accordance with a write enable signal w. Data read-out from the RAM 33 are supplied to a D/A converter 35 in which the input data are converted to an analog signal. The output signal of the D/A converter 35 is supplied, through an LPF 36, to a sync insertion circuit 37 in which the synchronizing signals are added, to reproduce the video signal. The video signal outputted from the sync insertion circuit 37 is supplied to the other one of the input terminals of the change-over switch 30. The change-over switch 30 is supplied with a control signal of switching operation from a system controller 40. Through this change-over switch 30, one of the video signal passed through the RAM 33 and the video signal directly supplied from the CCD 24 to the change-over switch 30 is selectively supplied to a character insertion circuit 41. The character insertion circuit 41 is constructed to combine a video signal corresponding to characters indicated by data supplied from the system controller 40 with the video signal from the change-over switch 30. A video signal outputted from the character insertion circuit 41 is supplied to a video output terminal 42.

The system controller 40 comprises a microcomputer which is made up of a processor, a ROM, a RAM, and so on. The system controller 40 is supplied with the synchronizing signals and the control data from the separation circuit 26, data in response to the key operation of operation part 48, a loading detection signal from a disk loading mechanism, a disk detection signal, and so on In the system controller 40, the processor executes signal processing operations in accordance with programs previously stored in the ROM, and controls the operation of various parts, e.g. the slider servo circuit 6, the spindle servo circuit 27, the change-over switch 30, the memory control circuit 34, the character insertion circuit 41, a drive circuit 43 for driving the laser diode, a track jump drive circuit 44 which drives the tracking actuator in response to a jump command, motor drive circuit 46 for driving a motor 45 of the disk loading mechanism, and a display circuit 47. A power current Vcc is supplied to a power supply terminal of the system controller 40 by way of a diode D. A capacitor C is connected across this power supply terminal of the system controller 40 and ground. By means of these diode D and capacitor C a back-up circuit 49 is formed, so that the power supply to the system controller 40 is continued even when a power switch is turned off.

With the above construction, the operation of the processor in the system controller 40 will be described with reference to the flowchart in FIGS. 2 through 6.

When the power current is thrown-in, the processor proceeds to a step $S_1$ at which a memory check operation is performed by comparing a bit pattern of data obtained by reading-out the content of a predetermined address of the RAM in the memory controller 40 with a predetermined bit pattern. Then the processor proceeds to a step $S_2$ at which whether or not the memory content of the RAM in the system controller 40 is normal is determined in accordance with a result of the comparison at the step $S_1$. If it is determined at the step $S_2$ that the memorized content of the RAM in the system controller is not normal, the processor proceeds to a step $S_3$ at which a normal memory flag is cleared, and start the execution of other routines for initial setting of various parts, for example. If, on the other hand, it is determined at the step $S_2$ that the memorized content of the RAM in the system controller 40 is normal, the processor proceeds to a step $S_4$ at which the normal memory flag is set, and the execution of other routine is started.

If the operation part 48 is manipulated during the execution of the main routine or the subroutine for controlling the playing operation of the system, the processor proceeds to a step $S_5$ at which whether or not a last scene (portion) reproducing command is issued by an operation of a last memory key is detected. If it is detected, at the step $S_5$, that the last scene reproducing command is not issued, the processor restarts the execution of a routine which was being executed immediately before the processor proceeded to the step $S_5$. If on the other hand, it is determined at the step $S_5$ that the last scene reproducing command is issued, the processor proceeds to a step $S_6$, to determine whether or not the playing operation is being performed.

If it is determined at the step $S_6$ that the playing operation is not performed, the processor proceeds to a step $S_7$, to supply a loading command to the motor drive circuit 46, in order to start the disk loading operation of the disk loading mechanism 52. Subsequently, the processor proceeds to a step $S_8$ at which presence or absence of the disk is determined by using the disk detection signal b. If it is determined at the step $S_8$ that the disk is not present, the processor restarts the execution of the routine which was performed just before proceeding to the step $S_5$. If on the other hand, it is determined that the disk is present at the step $S_8$, the processor proceeds to a step $S_9$, to supply a lighting command to the drive circuit 43, so that the laser beam is emitted from the laser diode in the pickup 3. Subsequently, the processor proceeds to a step $S_{10}$, to supply a start command to the spindle servo circuit 27, the focus servo circuit (not shown), the tracking servo circuit (not shown), and the slider servo circuit 6, so as to enable the read-out of information recorded on the disk 2.

Subsequently, the processor proceeds to a step $S_{11}$, to detect properties of the disk 2 such as the disk size, the type of recording (OAV or OLV), the recording side (side A or side B), and to store data indicating the disk properties in an address designated as "present value memory" in the RAM of the system controller 40. Then the processor proceeds to a step $S_{12}$, to determine whether or not the normal memory flag is set. If it is determined at the step $S_{12}$ that the normal memory flag is not set, the processor proceeds to a step $S_{13}$, to stop the read-out operation, and to restart the execution of the routine which was being executed immediately before proceeding to the step $S_5$. If it is determined at the step $S_{12}$ that the normal memory flag is set, the processor proceeds to a step $S_{14}$, at which the data representing the disk property stored in the present value memory and data representing the disk property stored in an area of the RAM in the controller 40 designated as "last memory" are compared with each other, so as to determine whether or not the property of the disk under playing and the property of a disk which was played last time are identical with each other. If it is determined at the step $S_{14}$ that the disk properties are not identical with each other, the processor proceeds to the step $S_{13}$. If it is determined at the step $S_{14}$ that the disk properties are identical with each other, the processor proceeds to a step $S_{15}$, to determine whether or not the address written in the last memory is identical with the code of lead-out area of the disk 2. If it is determined at the step $S_{15}$ that the address written in the last memory is identical with the code of the lead-out area, the processor proceeds to the step $S_{13}$. If on the other hand, it is determined at the step $S_{15}$ that the address written in the last memory is not identical with the code of the lead-out area, the processor proceeds to a step $S_{20}$, to search the address written in the last memory.

Subsequently, the processor proceeds to a step $S_{21}$, to start the playing operation from the address searched out, and to restart the execution of the routine which was being executed immediately before the proceeding to the step $S_5$.

If it is determined at the step $S_6$ that the playing operation is going on, the processor proceeds to a step $S_{16}$, to determine whether or not a predetermined time period $T_2$ has elapsed after the start of the playing operation. If it is determined at the step $S_{16}$ that the predetermined time period $T_2$ has elapsed after the start of the playing operation, the processor restarts the execution of the routine which was being executed immediately before the proceeding to the step $S_5$. If on the other hand, it is determined at the step $S_{16}$ that the predetermined time period $T_2$ has not elapsed after the start of the playing operation, the processor proceeds to the step $S_{17}$, to determine whether or not the normal memory flag is set. If it is determined at the step $S_{17}$ that the normal memory flag is not set, the processor restarts the execution of the routine which was being executed immediately before the proceeding to the step $S_5$. If on the other hand, it is determined at the step $S_{17}$ that the normal memory flag is set, the processor proceeds to a step $S_{18}$, in which the data indicating the disk property stored in the present value memory and the data indicating the disk property stored in the last memory are compared, to determine whether the property of the disk under playing is identical with the property of the disk which was played last time. If it is determined at the step $S_{18}$ that the disk properties are not identical with each other, the processor restarts the execution of the routine which was being executed immediately before the proceeding to the step $S_5$. If, on the other hand, it is determined that at the step $S_{18}$ that the disk properties are identical with each other, the processor proceeds to a step $S_{19}$, to determine whether or not the address written in the last memory is identical with the code of the lead-out region. If it is determined at the step $S_{19}$ that the address written in the last memory is identical with the code of the lead-out region, the processor restarts the execution of the routine which was being executed immediately before the proceeding to the step $S_5$. If, on the other hand, it is determined at the step $S_{19}$ that the address written in the last memory is not identical with the code in the lead-out region, the processor proceeds to the step $S_{20}$.

Furthermore, if the keys are operated by the user while the play operation is performed through the execution of the subroutine for controlling the play operation for example, the processor proceeds to a step $S_{30}$, to determine whether or not the memorization command key is operated and the memorization command is generated. If it is determined at the step $S_{30}$ that the memorization command is not generated, the processor restarts the execution of the routine which was being executed immediately before the proceeding to the step $S_{30}$. If, on the other hand, it is determined at the step $S_{30}$ that the memorization command is generated. The processor proceeds to a step $S_{31}$ at which the data indicating the property of the disk under playing is transferred to an address in an area of the last memory which is designated as "previous value memory".

Subsequently, the processor proceeds to a step $S_{32}$, at which a value corresponding to a predetermined time period $T_1$ is subtracted from address data indicating the address in which information under reproduction is recorded. Then the processor proceeds to a step $S_{33}$, to determine whether or not data x obtained at the step $S_{32}$ is smaller than 0.

If it is determined at the step $S_{33}$ that the data x is smaller than 0, the processor proceeds to a step $S_{34}$ at which address data indicating the head address of the disk 2 is transferred to a predetermined address in an area of the last memory. If it is determined at the step $S_{33}$ that the data x is not smaller than 0, the processor proceeds to a step $S_{35}$ at which the data x is transferred to a predetermined address in the area of the last memory.

Then the processor proceeds to a step $S_{36}$, to write, in a predetermined address of the RAM in the system controller 40, data having a predetermined bit pattern, and to restart the execution of the routine which has being executed immediately before the proceeding to the step $S_{30}$.

Through the steps of $S_{30}$ through $S_{36}$ in the above operation, address data indicating a second recording position which is the predetermined time period $T_1$, in the order of recording, before the first recording position in which the scene or portion at the time of interruption is recorded, are written into the last memory if the memorization command key is operated under the need of interrupting the viewing of the recorded program such as a motion picture. When the power supply is turned-off subsequently, the power current from the back-up circuit 49 is still supplied to the system controller 40. Therefore, the data written in the last memory is maintained as it is.

When the power supply is turned-on by the user in order to view the rest of the recorded program such as the motion picture, whether or not there is any abnormality in the memorized content of the RAM in the system controller 40 is determined through the operations of the steps $S_1$ through $S_4$. If it is determined that there is an abnormality in the memorized content of the RAM in the system controller 40, the normal memory flag is cleared so that the memorized data in the last memory will not be used.

When the last memory key is operated by the user, the disk is loaded automatically by the steps $S_5$ through $S_{21}$. If the property of the loaded disk is identical with the property of the disk whose playing has been interrupted, the system searches the second recording position which is a distance corresponding to the predetermined time period $T_1$, in the order of recording, before the first recording position in which the scene or portion at the time of interruption is recorded, and the playing operation is started from the second recording position. Therefore, by setting the predetermined time period $T_1$ to be equal to the time period which is necessary for the user to recall the story, the playing of the program after the scene at the time of interruption will be performed without generating the discontinuity of the story.

Also in the case that the user operates the last memory key within the predetermined time period $T_2$ after the start of the playing operation, the second recording position is searched out in the same manner, to restart the playing operation from the second recording position.

Figure 3:
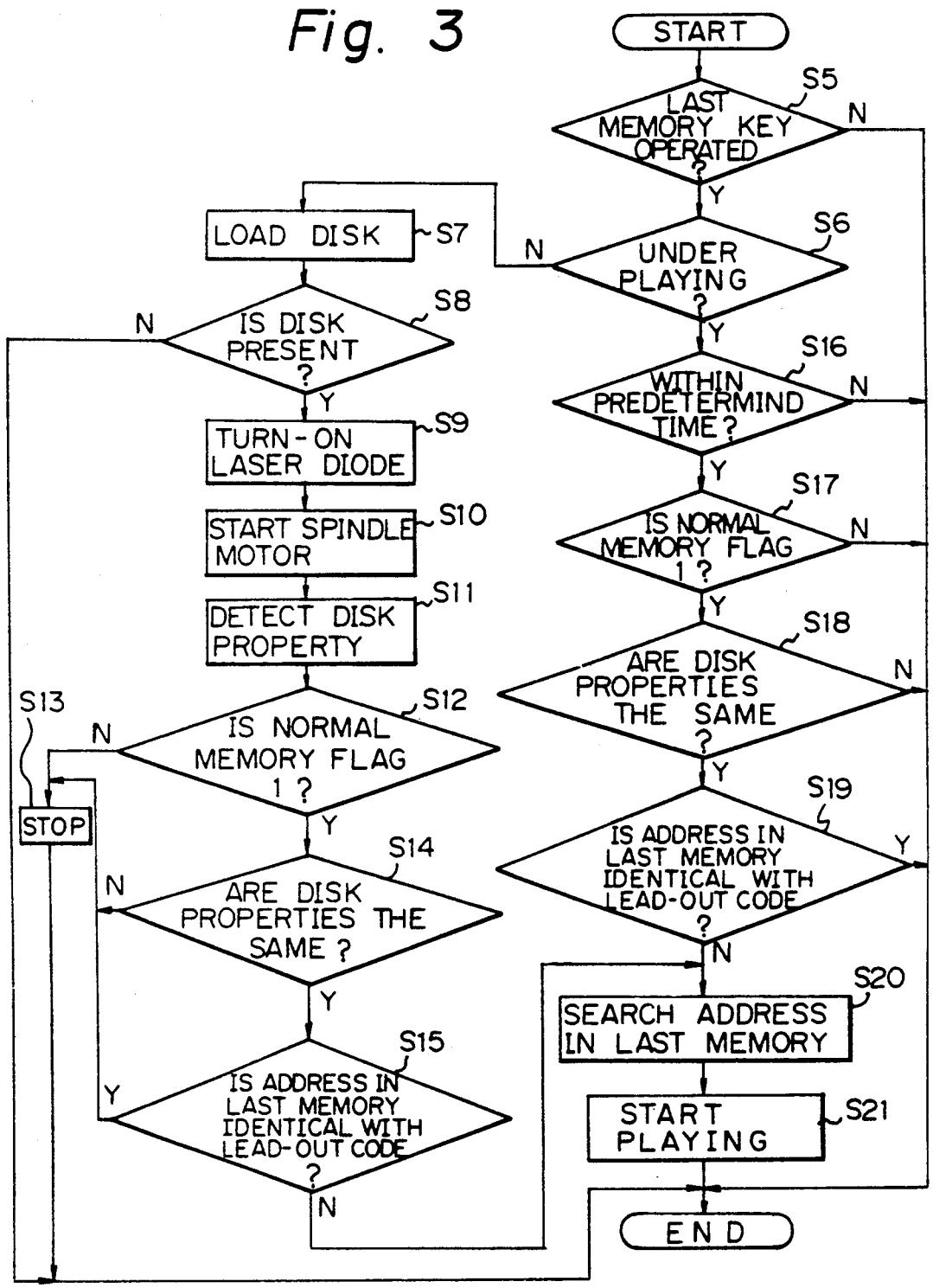
FIG. 3 is a flowchart showing an example of the operation of the system of FIG. 1 after the operation of a last memory key.
Figure 5:
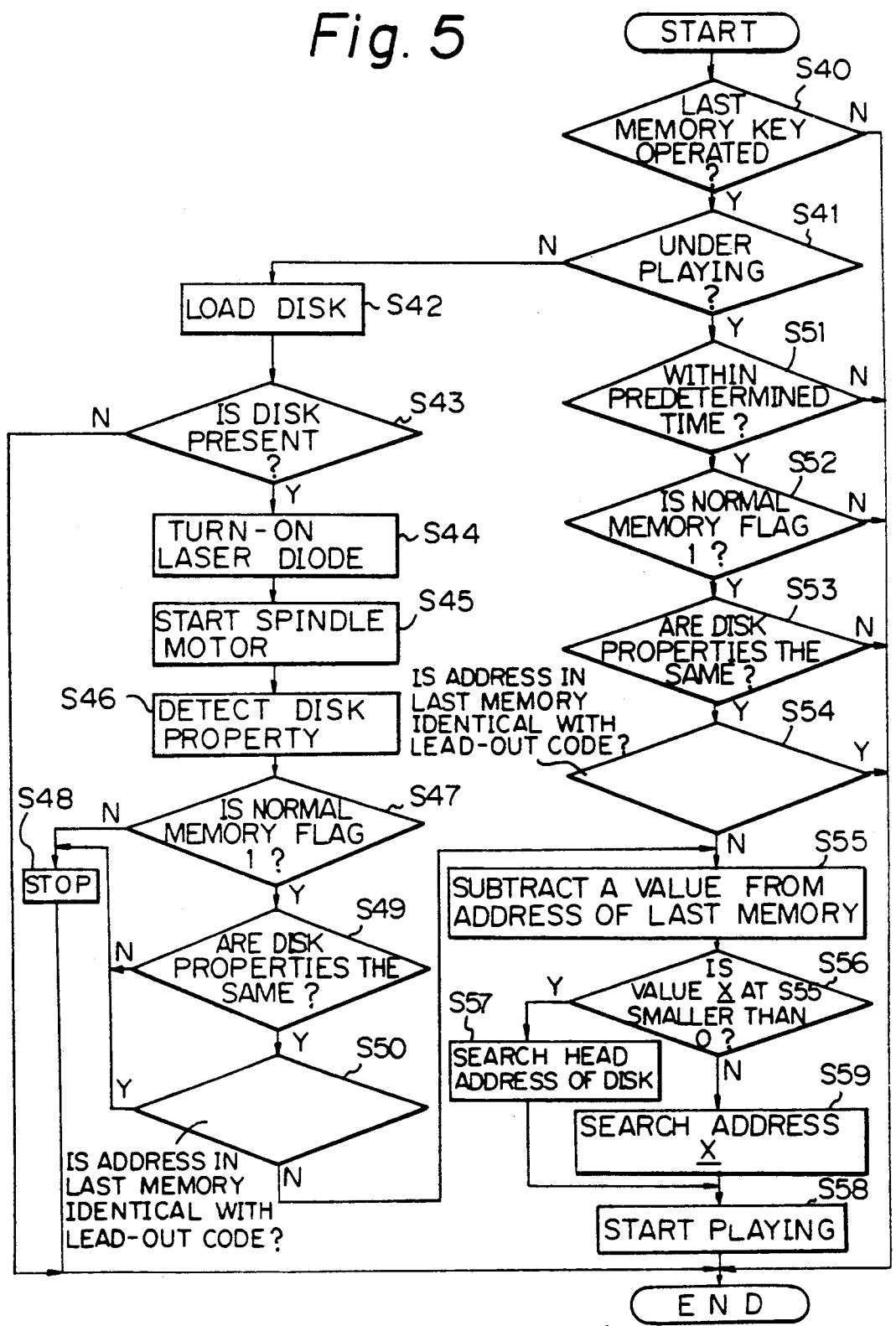
FIG. 5 is a flowchart showing another example of the operation of the system of FIG. 1 after the operation of the last memory key.
Figure 6:
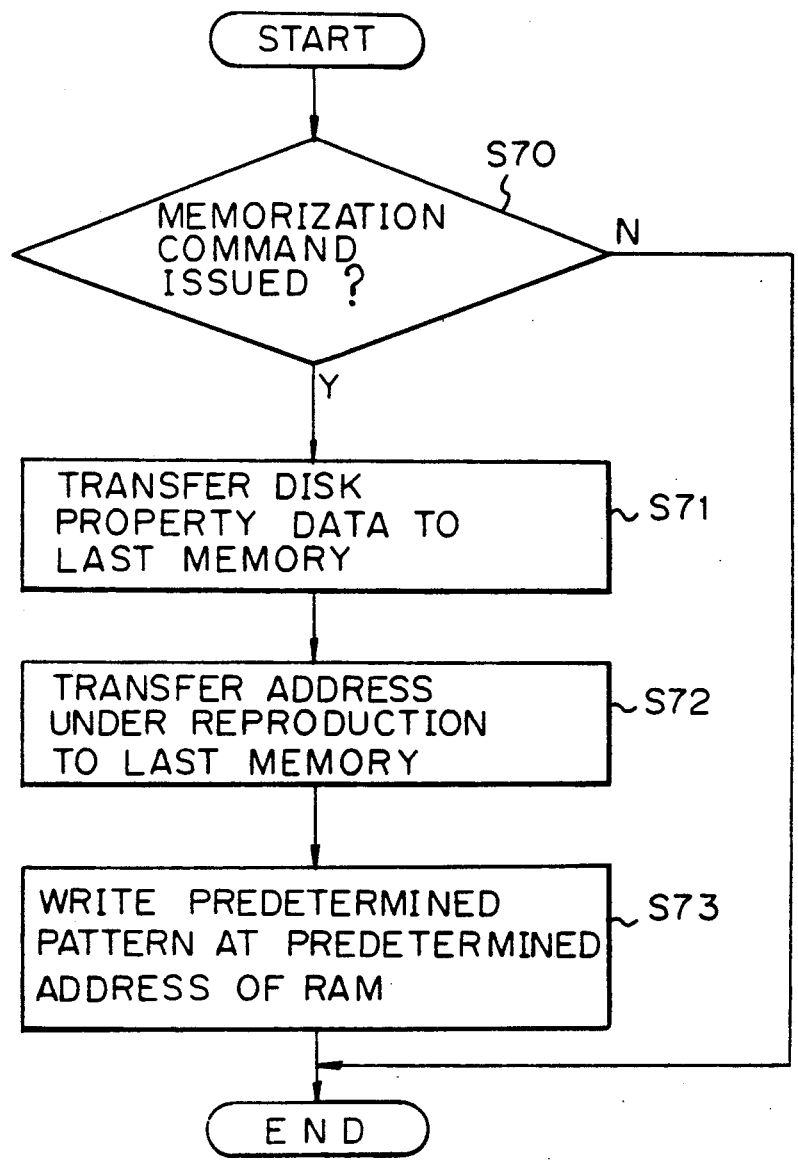
FIG. 6 is a flowchart showing another example of the operation of the system of FIG. 1 after the operation of the memorization command key.

FIGS. 5 and 6 are flow charts showing another example of the operation of the processor in the system controller 40. In steps $S_{40}$ through $S_{54}$ the same operations as those in the steps $S_5$ through $S_{19}$ in FIG. 3 are executed. If it is determined at the step $S_{50}$ or the step $S_{54}$ that the address written in the last memory is identical with the code of the lead-out region, the processor proceeds to a step $S_{55}$, to subtract the value corresponding to the predetermined time period $T_1$ from the address data written in the last memory. Subsequently, the processor proceeds to a step $S_{56}$, to determine whether or not the data x obtained at the step $S_{55}$ is smaller than 0.

If it is determined at the step $S_{56}$ that the data x is smaller than 0, the processor proceeds to a step $S_{57}$, to search the head address of the disk 2. Subsequently, the processor proceeds to a step $S_{58}$, to start the playing from the searched address, and to restart the execution of the routine which was being executed immediately before the proceeding to the step $S_{40}$.

If, on the other hand, it is determined at the step $S_{56}$ that the data x is not smaller than 0, the processor proceeds to a step $S_{59}$, to search an address corresponding to the data x, and the processor proceeds to the step $S_{58}$.

Figure 4:
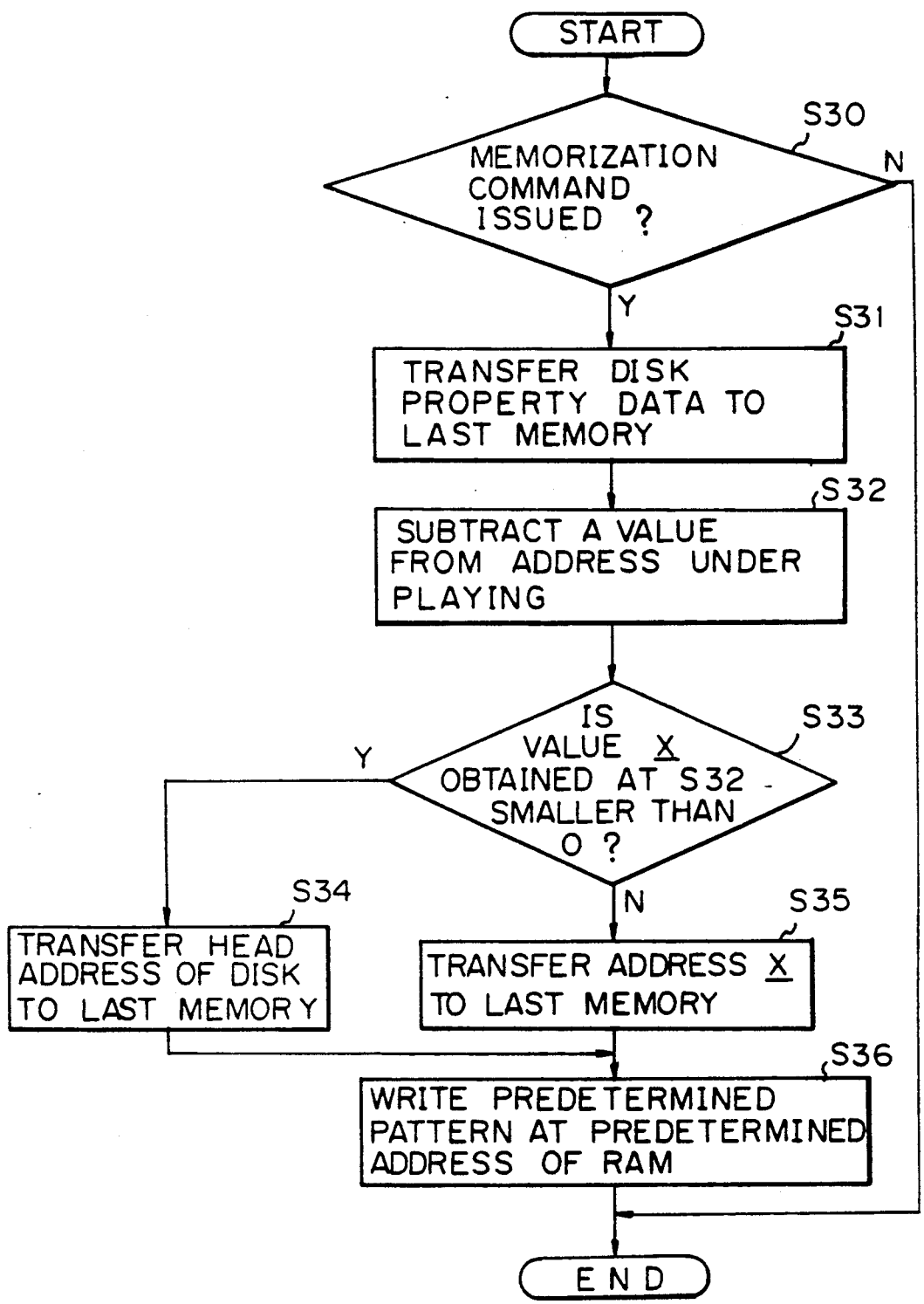
FIG. 4 is a flowchart showing an example of the operation of the system of FIG. 1 after the operation of a memorization command key.

At steps $S_{70}$ and $S_{71}$ shown in FIG. 6, the operations the same as those of the steps $S_{30}$ and $S_{31}$ in FIG. 4 are performed. At a step $S_{72}$ subsequent to the step $S_{71}$, the processor transfers the address data indicating the first recording position in Which the information under reproduction is recorded to a predetermined address in an area of the last memory. Then the processor proceeds to a step $S_{73}$, to write the data having the predetermined bit pattern into the predetermined address of the RAM in the system controller 40, and to restart the execution of the routine which was being executed immediately before the processor proceeded to the step $S_{70}$.

Also by the above operation, the second recording position which is the predetermined distance corresponding to the predetermined time period $T_1$, in the order of recording, before the first recording position in which the picture of the time of interruption is recorded is searched out, and the playing operation is started from the searched-out second recording position. Therefore, the playing of the program after the position, such as the picture, of the time of interruption is performed without generating the discontinuity of the program such as a story.

In the above described embodiments, the second recording position which is the predetermined distance corresponding to the predetermined time period $T_1$ from the first recording position is searched out, and the playing operation is started from the searched-out second recording position. However, the arrangement is not limited to this, and it is also possible to operate the system in such a manner that the pickup is moved back by the distance corresponding to the first predetermined time period $T_1$ by means of a track jump operation or scanning playing operation after the first recording position is searched out, and the playing operation is started subsequently.

As described in detail above, the last portion reproducing method for use in a disk playing system according to the present invention is characterized by the steps of memorizing address data corresponding to the first recording position in which the information under playing is recorded, and starting the reproduction of the recorded information from the second recording position which is, in order of recording, before the first recording position by using the address data recorded in response to the last portion reproducing command. Thus, the playing operation is started from the position which is before the position of the time of interruption by a simple operation, i.e. one operation of the last memory key and the memorization command key respectively. Therefore, it is possible for the user to recall the first part of the program such as the story up to a last portion or scene at which the playing was interrupted. Thus it is possible to view the rest of the program without generating the discontinuity of the program or story.

Furthermore, with the function of calculating the address data indicating the second recording position and directly searching the second recording position to start the playing operation, there is an advantage that the playing of a last portion is performed more rapidly than the case in which the first recording position is searched at first, and the pick up is moved back for the distance corresponding to the predetermined time period $T_1$ by means of the track jump operation or the scanning playing operation before the start of the playing operation. Furthermore, with the above mentioned operation it is possible to avoid the playing of unnecessary portions or pictures during the track jump operation or the scanning playing operation.

While preferred embodiments have been described, it will be understood that the last portion reproducing method of the present invention is not limited for use in a video disk player system, and within the scope of the appended claims, the invention may be practiced otherwise than as specifically described.

What is claimed is:

1. A method of reproducing from a previously played position on a video disk in which information recorded on the video disk is reproduced together with address information indicating a position in a recording area of said recording disk, said method comprising the steps of:

interrupting playback of said video disk by a user;
    generating a memorization command for initiating storage of address information of a first recording position during playback of said video disk upon interruption of playback by a user;
    storing into a memory device, address data corresponding to the address information of the first recording position of said video disk at which information under reproduction is interrupted for later determining a position at which playback is restarted, in response to the issuance of said memorization command;
    generating a second recording position, at a predetermined place, in order of recording, before said first recording position;
    storing into said memory device address data corresponding to the address information indicating said second recording position;
    generating a reproduction command triggered by a user upon restarting playback from said second recording position so that said video disk is played back starting from said second position; and
    restarting the playback operation of said disk playing apparatus from said second recording position of said video disk in response to said last portion reproduction command.

2. The method of claim 1, further comprising the step of subtracting a predetermined value from said address data memorized in said memory device of said first recording position to obtain said address data of said second recording position.

3. The method of claim 1, further comprising the step of determining that said address data is memorized in response to the issuance of said data reproduction command.

4. A method as claimed in claim 1, further comprising the steps of:

determining if the second recording position address is identical to a lead out position address of the disk; and
    starting reproduction of the disk at a beginning position of the disk upon determination the second recording position address is identical to the lead out portion address.

5. The method according to claim 1, further comprising the step of restarting playback from said first recording position in response to the issuance of said memorization command and the absence of said reproduction command.

6. A method of reproducing from a previously played position a video disk in which information recorded on the video disk is reproduced together with address information indicating a position in a recording area of said video disk, said method comprising the steps of:

interrupting playback of a video disk by a user;
    generating a memorization command for initiating the storage of address information of a first recording position during playback of said video disk upon interruption of playback by a user;
    storing into a memory device, first address data corresponding to the address information of the first recording position of said video disk at which information under reproduction is recorded for later determining a position at which playback is restarted, in response to the issuance of said memorization command;
    generating a data reproduction command by a user upon desiring to restart playback from a second recording position so that a portion of said video disk preceding interruption is playback;
    generating second address data corresponding to the address information indicating said second recording position using said address data stored in said memory devices, said second address data corresponding to a recording position at a predetermining distance, in order of recording, prior to the first recording position; and
    restarting the playback operation of said disk playing apparatus from said second recording position of said video disk in response to said last portion reproduction command.

7. The method of claim 6, wherein said step of generating second address data comprises the step of subtracting a predetermined value from said address data memorized in said memory device of said first recording position to obtain said address data of said second recording position.

8. The method of claim 6, and further comprising the step of determining that said address data is memorized in response to the issuance of said data reproduction command.

9. A method as claimed in claim 6, further comprising the steps of:

determining if the second recording position address is identical to a lead out position address of the disk; and starting reproduction of the disk at a beginning position of the disk upon determination the second recording position address is identical to the lead out portion address.

10. The method according to claim 7, further comprising the step of restarting playback from said first recording position in response to the issuance of said memorization command and the absence of said data reproduction command.

11. A method of reproducing from a previously played position on a video disk in which information recorded on the video disk is reproduced together with address data indicating a position in a recording area of said disk, said method comprising the steps of:

interrupting playback of said video disk by a user;

detecting a first address data read from said video disk when playback of said video disk is interrupted;

generating a second address data by subtracting a predetermined value from said first address data;

storing into a memory device said second address data;

generating a reproduction command triggered by a user upon restarting playback;

detecting whether said second address data is stored in said memory device;

restarting playback of said video disk from said second address when it is detected in said detecting step that said second address data is stored in said memory.

12. A method of reproducing from a previously played position on a video disk in which information recorded on the video disk is reproduced together with address data indicating a position in a recording area of said video disk, said method comprising the steps of:

interrupting playback of said video disk by a user;

detecting a first address data read from said video disk upon interruption of playback of said video disk;

storing into a memory device said first address data;

generating a reproduction command triggered by a user upon restarting playback;

detecting whether said first address data is stored in said memory device;

generating a second address data by subtracting a predetermined value from said first address data when it is detected n said detecting step that said first address data is stored in said memory device;

restarting the playback operation of said video disk from said second address.

* * * * *